UNITED STATES PATENT OFFICE 2,558,106

PRODUCTION AND UTILIZATION OF WATER-SOLUBLE ORGANIC GALLIC ACID COMPOSITIONS

Arthur Schmorr and Murray Katz, Bronx, N. Y.; said Katz assignor to said Schmorr No Drawing. Application November 24, 1948, Serial No. 61,928

1 Claim. (Cl. 260—500)

This invention relates broadly to the production and utilization of water-soluble organic gallic acid compositions which will be serviceable for preparing solutions intended for subcutaneous injection. More particularly, it relates to reaction products of gallic acid alkyl esters with hydroxylamine hydrochloride in alkaline solution, embracing 3,4,5,trihydroxybenzohydroxamic acid, certain intermediates, and derivatives.

Such gallic acid derivatives have been found to be serviceable for the preparation of aqueous solutions suitable for use as subcutaneous injections, and otherwise, for the induction of local anesthesia in minor surgery, etc., and without untoward systemic reactions. Such solutions also possess some antibacterial activity.

By way of illustration, but without any precise limitation, the following examples are presented as a preferred method for producing and deriving the new compounds. It will be obvious that some materials, quantities, or steps may, within limits, be omitted, modified, or amplified without departing from the spirit and scope of the actual disclosures.

It has been found most generally advantageous, in order to produce this hydroxamic acid, to work with the n-propyl gallate. This ester is not available on the market, but it has been found that it may conveniently be prepared in adaptable quality and form by the following method.

n-Propyl gallate

About 52.4 g. of gallic acid are placed in a round bottom flask with 154 ml. of n-propyl alcohol. To this is added 3.1 ml. of concentrated sulfuric acid, and the entire mixture refluxed with stirring for about five hours. The condenser is then turned downward for distillation, and about 100 ml. of the alcohol are distilled off. The residue is then cooled, whereupon the n-propyl ester crystallizes out. The crystals thus obtained are filtered on a Buchner funnel, sucked almost dry, and then washed with a little cold water. The ester is recrystallized several times from hot water with the aid of a little charcoal. The material thus recrystallizes with one mole of water. The anhydrous ester, prepared by heating the hydrate at 105° C. for 2 hours, melts at about 148° C.

Copper gallo-hydroxamate

Thereafter, 69.5 g. of hydroxylamine hydrochloride, C. P. (1 mole), are added slowly, with stirring, to a 1000 ml. aqueous solution containing 140 g. (2.5 moles) potassium hydroxide, and then 115 g. of the n-propyl gallate monohydrate, as described, are added in small portions, with vigorous shaking after each addition, to insure complete solution. This mixture is allowed to stand for about 2 hours at room temperature without exposure to air. A deep red-brown solution is obtained, which is then acidified with sulfuric acid to pH 6.5, and an excess of a saturated copper sulfate solution added. Thereafter, the pH is then readjusted to 5.5. The pH at which the copper salt is precipitated is critical. At a higher pH, other copper salts, which do not contain the hydroxamic acid moiety, may be formed. The resulting green precipitate of copper salt is filtered off, washed well with water, then with alcohol, and finally with ether. Drying is completed by removing the salt from the filter, placing it in a shallow dish, and placing the dish in a stream of cool air. The yield is approximately 35 g.

Gallo-hydroxamic acid

The pure free acid is obtained by taking up 35 g. of dry copper salt in 200 ml. of hydrochloric acid and the mixture well stirred for about 5 or 10 minutes. The solution obtained is filtered and the filtrate saturated with hydrogen sulfide gas. The resulting copper sulfide is filtered off. The filtrate then consists of a solution of gallo-hydroxamic acid with some impurities. This solution is evaporated in a stream of air almost to dryness without heating, and the brown solid material remaining is filtered off with suction and repeatedly and rapidly recrystallized from hot water, using charcoal.

The gallo-hydroxamic acid thus obtained consists of greyish-white to tan needles having a M. P. 202–204° C. (uncorrected). It is moderately soluble in water at ordinary temperatures, and quite soluble in hot water, however, with slight decomposition. It is freely soluble in alcohol, acetone, and dioxane, with slight solubility in ether, but insoluble in benzene and petroleum ether.

The acid is readily hydrolyzed to gallic acid and hydroxylamine by heating, particularly in the presence of a strong mineral acid. Because it and its derivatives are very labile, heat should not be applied to solutions, except during recrystallizations, particularly in the presence of acids, and all drying of the acid should be done in a vacuum desiccator. The dry acid should be stored in tightly stoppered amber bottles.

In the clinical employment of this new compound, it has been found most desirable to prepare fresh solutions of the gallo-hexaminic acid, herein disclosed, extemporaneously with distilled water and alkali metal hydroxide or carbonate, of the desired concentration and isotonicity. Aqueous solutions of the acid per se rapidly become unstable, especially in the presence of acid.

What we claim is:

3,4,5,trihydroxybenzo-hydroxamic acid.

ARTHUR SCHMORR.
MURRAY KATZ.

REFERENCES CITED

The following references are of record in the file of this patent:

UNITED STATES PATENTS

| Number | Name | Date |
|---|---|---|
| 2,279,560 | Dietrich | Apr. 14, 1942 |
| 2,346,665 | Cupery | Apr. 18, 1944 |
| 2,397,508 | Rouault | Apr. 2, 1946 |

OTHER REFERENCES

Higgins and Black, Chem. Abstracts, vol 38, page 6118.

Porzeo and Torres, Chem. Abstracts, vol. 24, page 365.

Angeli and Castellana, Chem. Abstracts, vol. 4, page 1618.